Dec. 11, 1934.    J. F. PAGENDARM    1,983,771
REAR LAMP FOR VEHICLES
Filed July 17, 1930    2 Sheets-Sheet 1
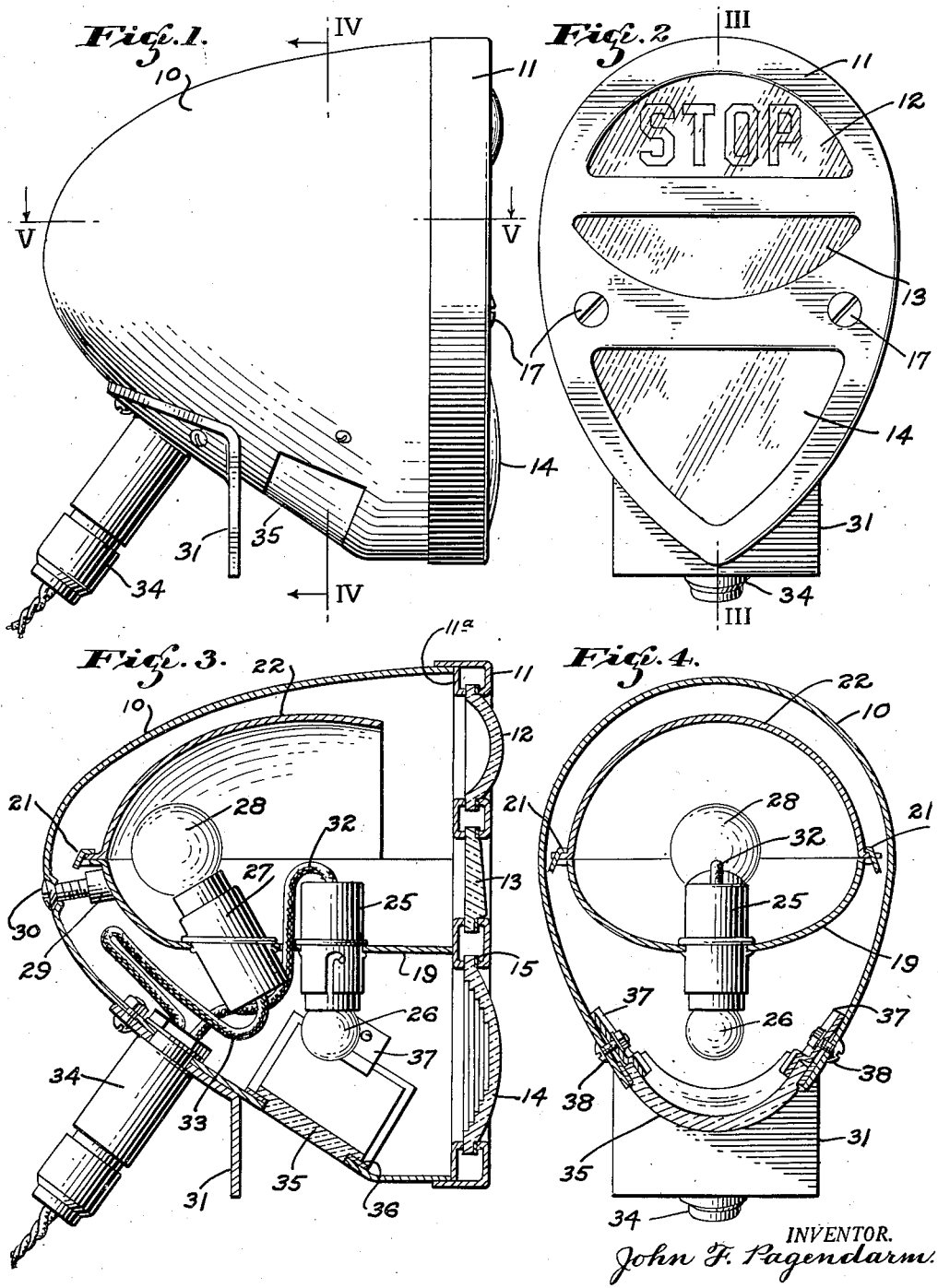

Dec. 11, 1934.  J. F. PAGENDARM  1,983,771
REAR LAMP FOR VEHICLES
Filed July 17, 1930   2 Sheets-Sheet 2
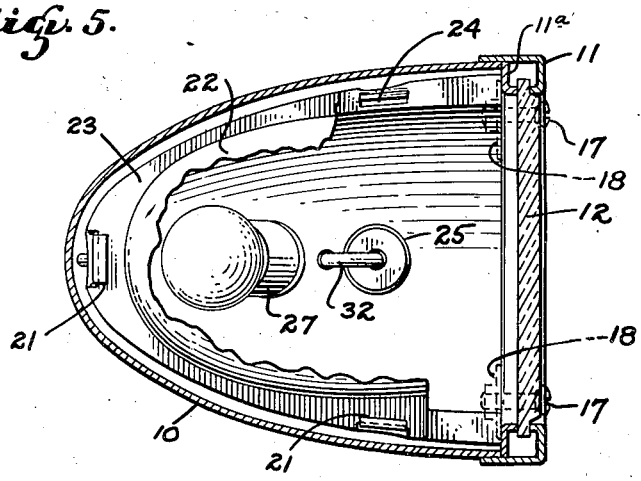
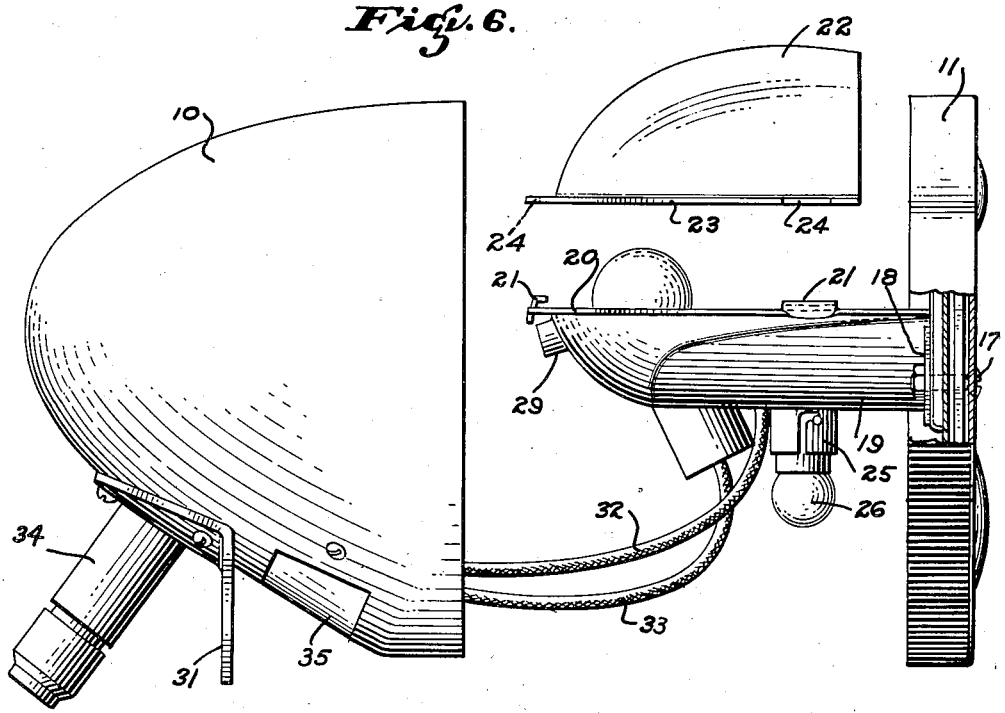
INVENTOR.
John F. Pagendarm
BY Townsend, Loftus & Abbett
ATTORNEYS.

Patented Dec. 11, 1934

1,983,771

UNITED STATES PATENT OFFICE 1,983,771

REAR LAMP FOR VEHICLES

John F. Pagendarm, Oakland, Calif., assignor to American Woodlite Corporation, San Francisco, Calif., a corporation of California Application July 17, 1930, Serial No. 468,597

2 Claims. (Cl. 177—392)

This invention pertains to vehicle lamps and more particularly to an improved lamp of the type used on the rear of automobiles and the like for showing the customary red driving light, for illuminating the license plate of the automobile, for showing a stop signal and for illuminating the road to the rear of the vehicle when the brakes are applied or when the vehicle is in reverse gear.

It is the object of this invention to generally improve the construction and design of such lamps so as to properly regulate the distribution of light for the several purposes served by the lamp, and to provide a lamp that may be dismantled through very simple operations for the purpose of cleaning, repairing or replacing its parts when necessary.

Further objects and advantages will become apparent through an understanding of the accompanying drawings and following specification in which a preferred embodiment of my invention is shown and described by way of illustration.

In these drawings—

Fig. 1 is a side elevation of the lamp embodying my invention,

Fig. 2 is a front elevation of the same,

Fig. 3 is a sectional view taken on the line III—III of Fig. 2,

Fig. 4 is a sectional view taken on the line IV—IV of Fig. 1,

Fig. 5 is a sectional view taken on the line V—V of Fig. 1, with parts broken away, and Fig. 6 is a side elevation of the lamp with the front frame and reflector shown as separated from the main body of the lamp.

Referring more particularly to the drawings, I show a main lamp housing 10. Slidably mounted over the open front of the housing 10 is a front frame 11. This frame is provided with three suitably formed apertures adapted to be covered by a stop-light glass 12, a backing-up light glass 13 and a tail-light glass 14. The stop-light glass is preferably red in color and is stamped with a suitable word, such as "Stop", to indicate the purpose of the light. The glass 13 is plain white so that rays of light may pass through it freely. The tail light glass 14 is also the conventional color red and is slightly convex, having a corrugated inner surface. A cork gasket, such as indicated at 15, forms a cushion between the glass and the front frame 11. A glass retaining frame 11a similar in shape to the front frame 11 is positioned to the rear of the glasses for holding them in place in the front frame. A pair of screws 17, best shown in Fig. 5, serves to hold the two frames together. The screws 17 also pass through a pair of lugs 18 which are formed on a supporting plate 19. The supporting plate 19, which extends horizontally from the rear of the front frame, is dish-shaped and has a flat flange 20 formed on its upper edge. The flange 20 is provided with three clips, as illustrated at 21, which are stamped out of the thin metal of which the supporting plate is formed. A reflector 22 is also formed with a flange around its edge, such as illustrated at 23, and provided with three notches 24 which correspond in position to the clips 21. The reflector 22 is made of thin metal, or any slightly resilient material, so that it may be easily disengaged from the supporting member 19. Disengagement of the reflector is accomplished by pressing its sides at its forward end together slightly until the notches 24 at its forward end are free of the clips 21. The reflector is then moved forward sufficiently to disengage the notch 24 from the clip 21 at its rear end and is then removed.

The supporting plate 19 also carries a downwardly extending bulb socket 25 of any conventional type for the reception of a tail-light bulb 26. An upwardly extending socket 27, also carried by the supporting plate 19, is adapted to receive a bulb 28. A threaded boss 29 is secured to the rear end of the supporting plate 19 for the purpose of receiving a screw 30 which extends through a suitable hole in the rear end of the housing 10. The peculiar position and function of this screw 30 is very important, as the supporting plate 19 which it engages is rigidly secured to the front frame 11. Thus it may be seen that tightening of the screw 30 will serve to draw the frame 11 toward the lamp housing and provide a tight joint between the frame and the housing. It is further important to notice that this single screw is the only means for maintaining the front frame in proper position on the housing, and through the position of the screw 30, this function is very effectively performed. Furthermore, the supporting plate 19, which carries the weight of both of the bulbs, their sockets and the reflector 22, is prevented from vibrating by means of engagement of the screw 30. It will therefore be seen that all of the mechanism within the interior of the lamp housing, as well as the front plate thereof, is held in a rigid position by this screw.

The bulbs 26 and 28 are energized by a circuit which includes a ground connection through their sockets and through the housing to the frame of the vehicle to which the lamp is connected by means of a suitable bracket such as illustrated at 31. The circuit also includes wires 32 and 33 which are connected to the bulbs 26 and 28 respectively, and lead through an outlet connection 34 to a storage battery, or other source of current supply. A manually operated switch, not shown, controls the flow of current through the wire 32 to the bulb 26 in the usual manner, and other switches, which may be of any conventional form, are automatically controlled upon operation of the brakes or the reverse gear of the vehicle to complete a circuit through the wire 33 to the bulb 28, thereby causing the bulb 28 to be energized, or lighted, when the brakes of the vehicle are applied or the reverse gear is operated.

It may be seen that the wires 32 and 33 are of sufficient length to permit the removal of the front frame 11, which carries the supporting plate 19, the bulbs and the reflector, from the housing, as shown in Fig. 6.

A glass 35 is provided in the lower side of the housing 11, and is maintained in position over a suitable aperture by means of a gasket 36 and a pair of clips 37 securely held to the housing by screws 38. This glass 35 is provided to permit the light rays from the globe 26 to illuminate a license plate, or the like, not shown, which may be positioned below the lamp. It will be noticed that the bulb 26 is so positioned in the housing that its direct rays are permitted to penetrate both the tail-light glass 14 and the license plate illuminating glass 35. The bulb 28 casts direct rays against the stop-light glass 12. The illuminating of the road to the rear of the vehicle requires a great deal more light than is provided by the direct rays of such a small bulb, and it is for this reason that the reflector 22 is provided. This reflector, as may be best seen in Fig. 3, does not interfere with the direct rays of the bulb 28, which strike the stop-light glass 12. The reflector, however, is formed as a hemi-ellipsoid of revolution and is so positioned with relation to the bulb 28 that it reflects rays from this bulb in concentration through the backing-up light glass 13, thereby clearly illuminating the road to the rear of the vehicle. The characteristic feature of this type of reflector is to project light rays through a remote focus from which position they diverge at a wide angle. In the present case the source of light or bulb 28 is positioned at the proximate focal point of the hemi-ellipsoidal reflector 22 while the lense or glass 13 is at the remote focal point thereof. The result is that light radiated from the bulb 28 is reflected upon a point within the glass 13 and diverges at a wide angle therefrom where it illuminates the road, not only directly to the rear of the vehicle, but on both sides of the vehicle to its rear as well. This illumination of a relatively broad area of the road is of great importance, as in backing up, it is usually impossible for the operator of the vehicle to see the road directly behind it, but he must be guided by objects to the side of the vehicle which are within his range of vision, and, with the ordinary type of light, very poorly illuminated.

Another one of the important features of the invention resides in the manner in which the parts of the lamp are separable for the purpose of cleaning and repairing. Fig. 6 of the drawings illustrate the manner in which the removal of the single screw 30 permits the front frame 11 to be separated from the housing 10.

When the front frame has been removed, the reflector 22 may be disengaged from the supporting plate 19 in the manner above described and the bulbs are thus exposed to view and are easily handled.

This feature is of great importance, as heretofore lights of this character have been so constructed as to render the removal of bulbs or repair of other small parts a very awkward task.

The reflector 22 is also easily exposed for cleaning, polishing or re-plating, as may be desired, when the lamp is dismantled.

While I have shown a preferred form of my invention, it should be understood that various changes may be resorted to in the construction and arrangement of its several parts without departing from the spirit and scope of the appended claims.

Having thus described my invention, what I claim and desire to secure by Letters Patent is:

1. A rear lamp for vehicles comprising an open faced cup shaped housing provided with an opening for illuminating a license plate in the bottom of the housing, a cover for the open face having openings for a stop light, backing light and tail light therein, arranged in the order named from top to bottom, a partition member extending from the cover towards the back of said housing, means for securing said partition member to said cover between the tail light opening and the backing light opening so that the tail light opening is on one side of the partition and the stop and backing light openings on the other side, a lamp bulb mounted on the partition and extending downwardly adjacent said license plate and tail light openings, a second lamp bulb mounted on said partition and extending upwardly into the upper part of said housing, a hoodlike reflector member completely overlying the second mentioned lamp and substantially filling the upper part of said housing above the partition, said partition and reflector member forming a compartment that is closed except at the front adjacent the cover, said compartment being of such shape as to reflect rays from said second mentioned lamp upwardly and outwardly through said stop light opening and downwardly and outwardly through the backing light opening, means for detachably securing said reflector member to said partition member, and means passing through the rear of said housing and engaging said partition member for holding the device in assembled relation.

2. A rear lamp for vehicles comprising an open faced cup shaped housing provided with an opening for illuminating a license plate, a cover for the open face having openings for a stop light, backing light and tail light therein, a partition member extending from the cover towards the back of said housing, means for securing said partition member to the cover in a position separating the license plate opening and tail light opening from the stop light and backing light openings, a lamp bulb mounted on the partition in a position to project light through said license plate and tail light openings, a second lamp bulb mounted on the partition, a hoodlike reflector member completely overlying said second lamp bulb and substantially filling the housing on one side of the partition, said partition and reflector member forming a compartment that is closed except at the front adjacent the cover, said compartment being of a shape to reflect rays from said second mentioned lamp upwardly through said stop light opening and downwardly through the backing light opening, means for detachably securing said reflector member to said partition member, and means passing through the rear of said housing and engaging said partition member for holding the device in assembled relation.

JOHN F. PAGENDARM.